(12) United States Patent
Ahmed et al.

(10) Patent No.: US 8,959,608 B2
(45) Date of Patent: Feb. 17, 2015

(54) SINGLE SIGN-ON FOR A NATIVE APPLICATION AND A WEB APPLICATION ON A MOBILE DEVICE

(71) Applicant: Cellco Partnership, Basking Ridge, NJ (US)

(72) Inventors: Shahid Ahmed, Monmouth Junction, NJ (US); Nanda Kumar, Parsippany, NJ (US); Patrick V. Bellone, Fanwood, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 86 days.

(21) Appl. No.: 13/727,199

(22) Filed: Dec. 26, 2012

(65) Prior Publication Data

US 2014/0181944 A1     Jun. 26, 2014

(51) Int. Cl.
*H04L 29/00* (2006.01)
*H04L 29/06* (2006.01)
*H04W 12/06* (2009.01)
*H04L 29/08* (2006.01)

(52) U.S. Cl.
CPC ........... *H04L 63/0815* (2013.01); *H04W 12/06* (2013.01); *H04L 67/04* (2013.01)

USPC ................ 726/8; 726/2; 726/3; 726/4; 726/5; 726/6; 726/7; 726/9; 726/10

(58) Field of Classification Search
USPC ....................................... 726/2–10
See application file for complete search history.

(56) References Cited

U.S. PATENT DOCUMENTS

| | | | |
|---|---|---|---|
| 2012/0151568 A1* | 6/2012 | Pieczul et al. | 726/8 |
| 2013/0086669 A1* | 4/2013 | Sondhi et al. | 726/8 |

* cited by examiner

*Primary Examiner* — Ghazal Shehni

(57) ABSTRACT

A mobile device includes a session maintainer application, a native application and a shell application and a link to a web application. If a user is seeking to access a native application, and an active session has not been established, user login credential is obtained, a session token is obtained upon verification of the user login credential, and the obtained session token is provided to the native application. If the user is seeking to access a web application, and an active session has not been established, a session token is obtained upon verification of the user login credential and the obtained session token is provided to the shell application. If an active session has been established then the obtained session token is automatically provided to the native or shell application when the user subsequently seeks access to the respective application.

20 Claims, 5 Drawing Sheets

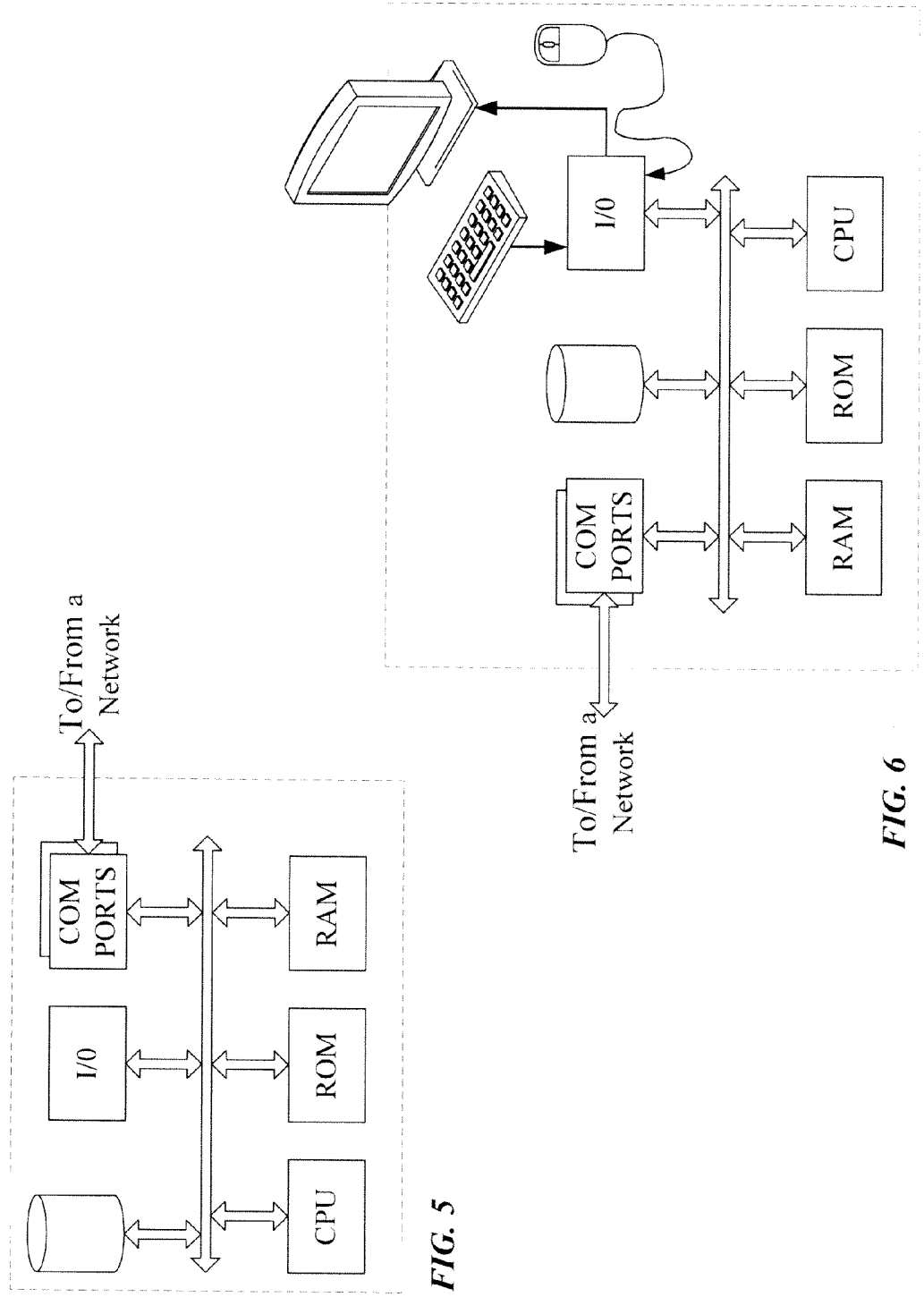

SINGLE SIGN-ON FOR A NATIVE APPLICATION AND A WEB APPLICATION ON A MOBILE DEVICE

BACKGROUND

In recent years, an increasing number of applications are designed to run on mobile devices. Applications running on a mobile device can be categorized as native applications or web applications. Native applications are stored locally on the mobile device and have binary code stored on the mobile device, whereas web applications have no binary code stored on the mobile device and work in a request/response model implemented via a web browser application on the mobile device. The mobile device executes the native application, although some may utilize network communication to obtain related content. Actual execution of the web application, however, occurs on one or more servers with which the mobile device communicates through a network. For the web application, the web-browser sends requests for some data/information to the external web application server using a URL. In response, the web application server sends back information which the web-browser displays on the screen of the mobile device.

A user of the mobile device often interacts with both native and web applications. An enterprise, such as an employer of the user, may provide both a native application and a web application. In order to secure data and company-confidential information, an enterprise needs to insure that only authorized employees can access the enterprise applications. An enterprise typically requires employees to login as the first step to access any enterprise application. In the mobile context, each enterprise application requires the user/employee to provide the respective application with the user's login credential. Separately logging on to each of multiple applications that require the same user login credential is tedious and inefficient.

Single sign-on (SSO) is an industry-standard mechanism widely used in desktop computing environments. When the user logs into one desktop application first and for accessing subsequent applications, the same login credential is used. Today an enterprise authentication system usually generates a session-token after it validates the user login credential. Applications need to have this session-token attached to all its server requests. If the server finds the token valid, it processes the request. Thus, users need to login just once and get a session-token for using with all applications. However, SSO for desktop computing environments is not readily adaptable in the context of mobile devices that implement by native applications and web applications.

As noted, the interactions between client and server for a web application take place via a web-browser, which is by its very nature isolated from other applications running on the device. Hence, native and web applications cannot readily share sign-on information among the various applications.

Hence, a need exists to allow the user to efficiently log on to different types of applications on a mobile device.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 5 is a simplified functional block diagram of a computer that may be configured as a host or server, for example, to function as a content server associated with a native application or a web application server in the system of FIG. 4.

FIG. 6 is a simplified functional block diagram of a personal computer or other work station or terminal device.

DETAILED DESCRIPTION

Figure 1:
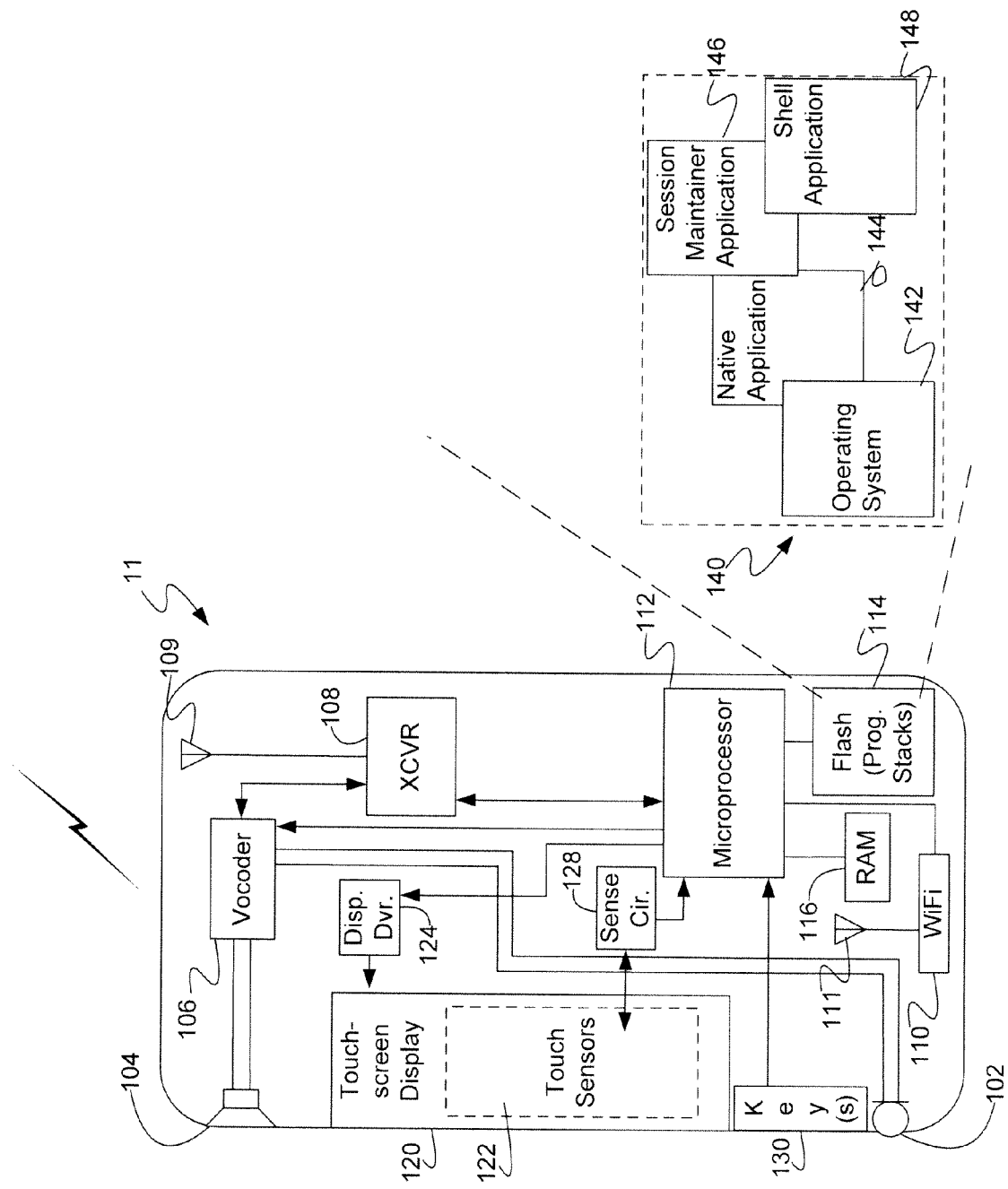
FIG. 1 is a high-level functional block diagram of an exemplary mobile device.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

The various examples disclosed herein relate to logging into applications of multiple types via a mobile device. The applications can include a native application and a web application.

As outlined earlier, native applications utilize stored executable programming code stored locally on the mobile device. A processor of the mobile device executes the native application, although the native application may utilize network communication to obtain related content, which are stored remotely.

By contrast, however, for a web application, executable code that is specific to the web application is not executed on the mobile device. The web application runs on a network and is accessible through an application (e.g., a shell application) that has access to the network. The executable web application runs on a network connected computer configured to operate as a server. In one example, the mobile device has a link, e.g. a URL, to the web application on the server computer. When the mobile device user selects the web application, the link is provided to a shell application (e.g. a browser or the like) executing on the mobile device. Based on the link, the shell application configures the mobile device to use a request/response model communication to obtain web pages and/or web content produced by execution of the web application on the sever computer, for presentation via the user interface offered by the shell application, or other type of local application (e.g., various types of browser applications, etc.) that has access to the network.

When a user request to access an application is received, a session maintainer application running on the mobile device checks to see if a session token is available. If the session token is available (e.g. as a result of a previously successful login), then the session token is used to log into the particular application. Alternatively, if the session token is not available, then a user login interface is provided for the user to enter a user login credential.

In an example, when the session token is not available, the user may be prompted to input a user login credential in order to access the application. The user login credential may include a single piece of information (e.g., username) and/or multiple pieces of information (e.g., username and password). In another example, the user login credential may correspond to one or more symbols, sounds, fingerprints, handprints, facial images, etc. A native application executing on the processor of the mobile device, for example, can locally enable the device to generate the prompt and receive the responsive user input(s). The user login credential may be verified locally or transmitted to a server associated with the application for verification; and a token may be generated for storage in the mobile device upon successful verification of the user login credential. For a web application that requires credential input, the first page presented by the shell application based on web application response from the server would prompt the user to input a credential (e.g. via boxes and key selection for a username and password input). The shell application collects the user input and sends the input information to the application server for validation. If valid, then the application server responds with information from regular execution of the web application, e.g. providing the user access to content and/or other functions of the web application via the browser/shell interface on the mobile device.

In either case, successful validation of the user credential results in generation of a session token which is stored in the mobile device. In an example, a server associated with the application may verify the user login credential, generate a token upon verification of the login credential, and transmit the generated token to the mobile device. In another example, the server associated with the application may verify the user login credential, transmit an indication of the verification to the mobile device, and a session token is generated locally (e.g., by the session maintainer application) upon receipt of the indication. In another example, the verification process may take place locally (e.g., by the session maintainer application) and a session token may be generated by the session maintainer application upon verification of the use login credential.

If the user is seeking to access a native application, then the session token is provided to the native application. Alternatively, if the user is seeking to access a web application, then the session token is provided to a shell application, which is a type of native application that runs on the mobile device and has similar capabilities as that of a web browser application. The shell application has access to a network which the web application runs on, and is specifically created to provide an interface for interacting with web applications from a mobile device. The shell application is designed to include several security features. For example, the shell application is configured to receive a session token, which is required to access the web application. User access to a web application via the shell application is granted only after the shell application receives the session token. The shell application may use cryptographic network protocols (e.g., Secure Shell, etc.) or other types of security protocols to provide secure data communication with the web application. In another example, the shell application may be configured to only provide access to select web applications (e.g., web applications provided by a specific enterprise). These security features are implemented to prevent unauthorized users from accessing the web application.

If a subsequent user request to access an application is received and the session token has not expired, then the session token is used to provide the selected application with the user's login credential. This subsequent token use can be by either of the native and web applications. Alternatively, if the user request to access an application is received after the session token has expired, then the user is prompted to again enter the user's login credential.

Reference now is made in detail to the examples illustrated in the accompanying drawings and discussed below. FIG. 1 illustrates a mobile device 11. FIG. 1 illustrates elements of the mobile device 11 in functional block diagram form, at a relatively high level.

It should be appreciated that the disclosed subject matter may be implemented using any mobile computing device having computing capability and mobile communication capability, configured to use those capabilities to conduct operations such as, for example, using a session token to sign on multiple applications on a mobile device, as discussed herein. In the example of FIG. 1, the mobile device 11 is in the form of a smart phone type mobile handset including a touch screen display. Examples of touch screen type mobile devices that may be used to implement mobile device 11 may include, but are not limited to, a smart phone, personal digital assistant (PDA), tablet computer or other portable device with mobile communication capability. However, the structure and operation of the touch screen type mobile device 11 is provided by way of example, and the subject technology as described herein is not intended to be limited thereto. For purposes of this discussion, FIG. 1 provides a block diagram illustration of the exemplary mobile device 11 having a touch screen display for displaying content and receiving user input as or as part of the user interface.

As discussed in more detail later, the mobile device 11 supports native applications and web applications, and a common set of user login credential (e.g., for a particular enterprise) are required for the user to access one application of each type. The exemplary mobile device 11 includes a session maintainer application 146, a native application 144 requiring a credential and a shell application 148 and a link to a web application that also requires the credential. If a user is seeking to access the native application 144, and an active session has not been established, a user login credential is obtained, a session token is generated (e.g., by the session maintainer application 146, by a server associated with the application, etc.) upon verification of the user login credential, and the generated session token is provided to the native application 144. If the user is seeking to access a web application, and an active session has not been established, a session token is generated upon verification of the user login credential and the generated session token is provided to the shell application 148. If an active session has been established and the token has not expired, then the generated session token is automatically provided to the native or shell application when the user subsequently seeks access to the respective application. In some examples, the mobile device 11 may only support native applications or web applications. However, functionalities of hardware components of the mobile device 11 would not change regardless whether the mobile device 11 supported only native applications, only web applications, and/or both native applications and web applications.

Although the operations that are the focus of discussions here will utilize data communications, a typical mobile device such as the exemplary smart phone 11, will also support voice communications. Hence, in the example shown in FIG. 1, mobile device 11 includes a microphone 102 for audio signal input and a speaker 104 for audio signal output. The microphone 102 and speaker 104 are communicatively coupled to a voice or audio encoder/decoder (vocoder) 106. For a voice telephone call, for example, the vocoder 106 provides two-way conversion between analog audio signals representing speech or other audio and digital samples at a compressed bit rate compatible with the digital protocol of wireless telephone network communications or voice over packet (Internet Protocol) communications. The vocoder, speaker and microphone may also be used as elements of the user interface during other operations of the device, including some types of data communications.

Also, as shown in FIG. 1, the mobile device 11 includes at least one digital transceiver (XCVR) 108, for digital wireless communications via a wide area wireless mobile communication network, although the mobile device 11 may include additional digital or analog transceivers (not shown). The transceiver 108 conforms to one or more of the various digital wireless communication standards utilized by modern mobile networks. Examples of such transceivers include, but are not limited to, transceivers configured to operate in accordance with Code Division Multiple Access (CDMA) and 3rd Generation Partnership Project (3GPP) network technologies including, for example and without limitation, 3GPP type 2 (or 3GPP2) and 3GPP Long Term Evolution (LTE), at times referred to as "4G." In an example, transceiver 108 provides two-way wireless communication of information including, digitized audio signals, still image and/or video signals, web page information for display as well as web related inputs, and various types of mobile message communications to/from the device.

Several of these types of communications through the transceiver and a network, as discussed later, will relate to, for example, transmitting requests to access content hosted by a server implementing a native and/or to communicate with a web application executing on a server, verifying login credential to access the native and/or the web application, receiving content from the server implementing the native and/or information obtained form processing of the web application, etc. Communications related to transmitting and/or receiving content from the server implementing the native and/or web application and verifying user access credential, for example, will often utilize Internet Protocol (IP) packet data transport utilizing the digital wireless transceiver (XCVR) 108 and over the air communications to and from base stations of the serving mobile network. Such communications may include specific mobile device application related data as may include related text, image, video and/or audio information.

Transceiver 108 also sends and receives a variety of signaling messages in support of various voice and data services provided by a network of a wireless service provider, to a user of mobile device 11 via the mobile communication network. Transceiver 108 connects through radio frequency (RF) send-and-receive amplifiers (not separately shown) to an antenna 109. Transceiver 108 may also support various types of mobile messaging services, such as short message service (SMS), enhanced messaging service (EMS) and/or multimedia messaging service (MMS). Although data communications involving mobile device application related data typically utilize IP data transport, such data communications may at times utilize one or more of these mobile messaging services for the data transport through the mobile communication network.

Many modern mobile devices also support wireless local area network communications over WiFi, instead of or in addition to data communications using the wide area mobile communication network. Hence, in the example of FIG. 1, for packet data communications, the exemplary device 11 also includes a WiFi transceiver 110 and associated antenna 111. Although WiFi is used here as the example, the transceiver 110 may take the form of any available two-way wireless local area network transceiver of a type that is compatible with one or more standard protocols of communication implemented in wireless local area networks, such as one of the WiFi standards under IEEE 802.11 and/or WiMAX. The transceiver 110, for example, may provide two-way data transport for wireless communication with a wireless access point in a residence or enterprise that the user frequents or with any available hotspot offered in a public venue. Although communicating through a different network or networks, the transceiver 110 supports various types of data communications similar to the packet data communications supported via the mobile network transceiver 108, including communications that may relate to transmitting requests to access content hosted by a server implementing a native and/or to communicate with a web application executing on a server, verifying login credential to access the native and/or the web application, receiving content from the server implementing the native and/or web obtained form processing of the application, etc.

WiFi, as in the illustrated example, has been widely adopted for wireless local area network communications, e.g., currently over distances of up to about 100 meters or so. Although this range is somewhat shorter than that available from mobile networks via the transceiver 108, the wireless local area network communications typically incur no or lower data usage charges than the communications via the transceiver 108 using the mobile network.

Mobile device 11 further includes a microprocessor (or "processor") 112, which serves as a programmable controller for mobile device 11 by configuring mobile device 11 to perform various operations, for example, in accordance with instructions or programming executable by processor 112. Such operations may include, for example, various general operations of mobile device 110 as well as operations implemented by execution of various applications that have been installed on the mobile device 11. For purposes of the present discussion, the mobile device operations implemented by processor execution of appropriate programming also include operations related to single sign on for native and web applications and/or obtaining content or processing results via network communications with appropriate servers, and related operations as described herein.

A flash memory 114 is used to store, for example, programming or instructions such as the session maintainer application 146, for execution by the processor 112. Depending on the type of device, the mobile device 11 will store and run an operating system 142 through which the mobile device applications may be run on the device. Examples of operating systems include Android, Apple iOS (I-Phone or iPad devices), Windows Mobile, RIM BlackBerry operating system, or the like. The programming in the flash memory 114 will also include one or more application programs configured for execution on the processor 112 via or in cooperation with the specific operating system. The application programs under consideration in the present example include one or more native applications 144, at least one of which include the user login credential, as well as a shell application at for use to access a web application via network communication. Flash memory 114 may also be used to store mobile configuration settings for different mobile device applications or services executable at mobile device 11 (using processor 112). Mobile device 11 may also include a non-volatile random access memory (RAM) 116 for a working data processing memory.

Of course, other storage devices or configurations may be added to or substituted for those in the example. Such other storage devices may be implemented using any type of storage medium having computer or processor readable instructions or programming stored therein and may include, for example, any or all of the tangible memory of the computers, processors or the like, or associated modules.

As outlined above, the instructions or programming for the processor, which configure the mobile device 11, include a native application 144, a shell application 148 for network access to a web application, and a session maintainer application 146, as described herein. Program aspects of the technology may be thought of as "products" or "articles of manufacture" typically in the form of executable code or process instructions and/or associated data, e.g., for the session maintainer application, that is stored on or embodied in a type of machine or processor readable medium.

A mobile device under consideration here may include a variety of different types of user interface elements. For discussion purposes, in the smart phone example shown in FIG. 1, the user interface elements of mobile device 11 include a touch screen display 120 (also referred to herein as "touch screen 120" or "display 120"). For output purposes, the touch screen 120 will include a display screen, such as a liquid crystal display (LCD) or the like. For input purposes, touch screen display 120 includes a plurality of touch sensors 122. Other interface elements may include a keypad including one or more keys 130. For example, the keypad may be implemented in hardware as a T9 or QWERTY keyboard of mobile device 11 and keys 130 may correspond to the physical keys of such a keyboard. Alternatively, keys 130 (and keyboard) of mobile device 11 may be implemented as "soft keys" of a virtual keyboard graphically represented in an appropriate arrangement via touch screen display 120. The soft keys presented on the touch screen display 120 may allow the user of mobile device 11 to invoke the same user interface functions as with the physical hardware keys. In some implementations, the microphone 102 and speaker 104 may be used as additional user interface elements, for audio input and output, including with respect to some functions related to transmitting requests to sign on and related application access or usage, as described herein. In an example, a user login credential is keyed in via soft keys on the touch screen display 120 and/or via keys 130. In another example, the user login credential is received via microphone 102 as an audio signal. In a further example, the user login credential may correspond to fingerprints, handprints, which may be received via touch sensors 122 of touch screen display, or a fingerprint/handprint identification sensor (not shown). In a further example, the user login credential may correspond to a facial image, which may be obtained via a camera (not shown).

For output, touch screen display 120 is used to present information (e.g., text, video, graphics or other visible content) to the user of mobile device 11. Processor 112 controls visible display output on the LCD or other display element of the touch screen display 120 via a display driver 124, to present the various visible outputs to the device user. For example, the session maintainer application 146 may cause the processor 112 to operate the driver 124 to cause screen 120 to display a login interface for logging into the native application 144 or to present a login interface for logging into the web application during access using shell application 148.

In general, touch screen display 120 and touch sensors 122 (and one or more keys 130, if included) are used to provide the textual and graphical user interface for the mobile device 11. In an example, touch screen display 120 provides viewable content (e.g., an icon for a web application, an icon for a native application, etc.) to the user at mobile device 11. Touch screen display 120 also enables the user to interact directly with the viewable content provided in the content display area, typically by touching the surface of the screen with a finger or an implement such as a stylus.

In some implementations, touch screen display 120 is a capacitive touch screen display and touch sensors 122 are independent capacitors arranged as a grid and disposed at various points throughout a transparent conductive material (e.g., indium tin oxide) that is layered onto a hard surface composed of insulating material (e.g., glass). As another example, the respective locations of touch sensors 122 (e.g., capacitors) may correspond to different intersection points of a matrix of rows and columns of the layered conductive material. Alternatively, touch sensors 122 may include a grid of capacitive electrodes formed of one or more layers of transparent conductive material etched onto a sheet of hard insulating material, as described above. However, it should be noted that touch screen display 120 is not limited to either of the above-described implementations. Accordingly, touch screen display 120 may be implemented using any of various conventional or other techniques based on, for example, the type of capacitive touch screen technology desired for a particular implementation. User input includes touch of the display device with the user's finger, stylus or similar type of peripheral device used for user input with a touch screen.

As shown in FIG. 1, the mobile device 11 also includes a sense circuit 128 coupled to touch sensors 122 for detecting the occurrence and relative location/position of each touch with respect to a content display area of touch screen display 120. In this example, sense circuit 128 is configured to provide processor 112 with touch-position information based on user input received via touch sensors 122.

The information tracked by sense circuit 128 may be used by processor 112 to detect touching, for enabling the processor and thus the device 11 to perform operations in accordance with each touch, including any related to operations or the like with respect to single sign on and related application access or usage, as described herein.

The logic implemented by the processor of the mobile device 11, in the example, by the microprocessor 112, configures the processor to control various functions as implemented by the mobile device 11. The logic for a processor may be implemented in a variety of ways, but in our example, the processor logic is implemented by programming, such as the session maintainer program 146, etc., for execution by the microprocessor 112. The programming may take a variety of forms, and depending on the general program architecture, aspects relating to operations performed by the session maintainer program 146 (e.g., obtaining session tokens, updating session tokens, determining if a new session token is required, etc.) may be implemented in various ways. For example, the functions for obtaining session tokens, updating session tokens, determining if a new session token is required could be implemented using a special module in the operating system and/or as a standalone application program. In our example, the session maintainer program 146 may be a standalone application having privileged access rights to the operating system.

Hence, the example includes a number of programs 140, including the operating system (OS) 142, the native application 144, the session maintainer application 146, and the shell application 148 stored in the flash memory 114 for execution by the microprocessor 112. While in this example the session maintainer application 146 is discussed as a separate program 140, the session maintainer application 146 may also be part of the OS 142. Native application 144 and shell application 148 may be installed at the mobile device 11 based on install data for the application. Further different types of native applications 144 and/or shell application may also be installed at the mobile device. Install data includes data and/or other types of information that is used to install, or setup, the application for initial use at the mobile device 11 before user-specific configuration or personalization is applied. The install data may itself be programming which when executed by the microprocessor 112 installs the respective application for use at the mobile device 11.

The session maintainer application 146 is executed by the processor 112 whenever signals indicating an intent to access a native application and/or web application requiring a user login credential is received by the processor 112. These signals may be generated in response to a user interaction with one or more user interface elements (e.g., a user touch action with respect to a location on the touch screen display 120 at or near a location where an icon for the native application 144 and/or web application is displayed, keys 130, etc.). The session maintainer application 146 may request the processor 112 to search for a session token stored in flash 114 or any other hardware component of the mobile device 11. If the processor 112 does not locate a session token, session maintainer application 146 may request the processor 112 to provide a login interface for display on the user interface elements of mobile device 11 for the user to enter the user login credential.

A session token may expire under several circumstances. For example, the session token may expire after it has been generated for a threshold period of time. Alternatively, the session token may expire after the mobile device 11 is powered down. The session maintainer application 146 may check the status of the session token before the session token is provided to access the application. In an example, the session maintainer application 146 checks the status of the session token upon receipt of a request to access a native application and/or web application. In another example, the session maintainer application 146 periodically checks the status of the session token. In a case where the session token is determined to be expired, the session maintainer application 146 may request the processor 112 to provide a login interface for display on the user interface elements of mobile device 11 for the user to enter the user's login credential.

In an example, expired session tokens are not immediately deleted upon their respective expiration. In this case, the session maintainer application 146 requests the processor 112 to determine whether an obtained session token has expired. If the obtained session token has expired, then the session maintainer application 146 requests the processor 112 to provide a login interface for display on the user interfaces elements of mobile device 11.

The session maintainer application 146, upon receipt of the user login credential, provides processor 112 with instructions to transmit the user login credential via the transceiver 108 to a server (not shown in FIG. 1) associated with the native application and/or web application for verification. A session token is then generated upon verification of the user login credential. The session token may be generated by a processor (not shown) of the server upon verification of the user's login credential. In this case, the generated session token is transmitted to the mobile device 11. Alternatively, the session maintainer application 146, upon receipt of a verification of the user login credential from the server and via the transceiver 108, requests the processor 112 to generate a session token for logging into the respective application. If the user selects to access the native application 144, the processor 112 executes the native application 144 and provides the session token to the native application 144 for logging into the native application 144.

Once the user has logged into the native application 144, the user may access the native application 144 without having to enter in login credential until the session token has expired. Logging onto the native application 144 may grant the user with access functions of the native application 144 and/or to content associated with the native application 144. Content associated with the native application 144 may be stored either locally on the mobile device 11, on a remote server, etc. In an example in which content associated with the native application 144 is stored locally on the mobile device 11, the native application 144 is executed by the processor 112 to access the locally stored content and to interact with the locally stored content in accordance with user and/or system commands. Examples of user and/or system commands include commands to provide for display the content on the user interface elements of the mobile device 11 transmit, receive via the transceiver 108 content to the server, modify the content in response to a user request, etc. In a further example, content associated with the native application 144 provided from a server to the native application 144 via the transceiver 108. In this later case, the native application 144 is executed by the processor to access the received content and interact with the received content in accordance with user and/or system commands. The native application 144 is then executed by the processor 112 to provide display of the received content on the user interface elements of the mobile device 11.

Alternatively, if the user selected an icon for a web application, the processor executes shell application 148 and provides the session token to the shell application 148. Once the user has logged in via the shell application 148, the user may access the web application via shell application 148 without having to enter in login credential until the session token has expired. Logging on via the shell application 148 may grant the user with access to content associated with the web application. Content associated with the web application or obtained from server execution of the web application are provided from a server associated with the web application to the shell application 148 via the transceiver 108. The shell application 148 is then executed by the processor 112 to provide an interface to display the received content on the user interface elements of mobile device 11.

After a session token is generated, the generated session token may be used to access other subsequently launched applications (e.g., applications that are launched after the session token has been obtained, applications that are launched after the first application has been launched, etc). For example, if the session maintainer application receives a request to access another application after a session token has been obtained, a user login interface would not be provided. Instead, the session maintainer application 146 requests the processor 112 to use the obtained session token to access the subsequently launched application. If the user requested to log into the native application 144, then the generated session token is provided to the native application 144. Alternatively, if the user requested to log into a web application, then the generated session token is provided the shell application 148.

Certain applications may require an additional user login credential. In a case where additional user login credential is required, the session maintainer application 146 may request the processor 112 to provide a login interface for display on the user interface elements of mobile device 11 for the user to enter the user's login credential. For example, the login interface may only require an additional login credential not included in the session token. In this case, a new session token that includes both the originally provided login credential and the additional login credential is generated. In another example, the login interface requires the user's full login credential in order to generate a new session token, which includes both the originally provided login credential and the additional login credential. Alternatively, the session maintainer application 146, upon receipt of verification of the additional login credential, executes the processor to modify the original session token to grant access to the application that requires the additional login credential as well as other applications that only require the originally provided login credential to access.

Figure 2:
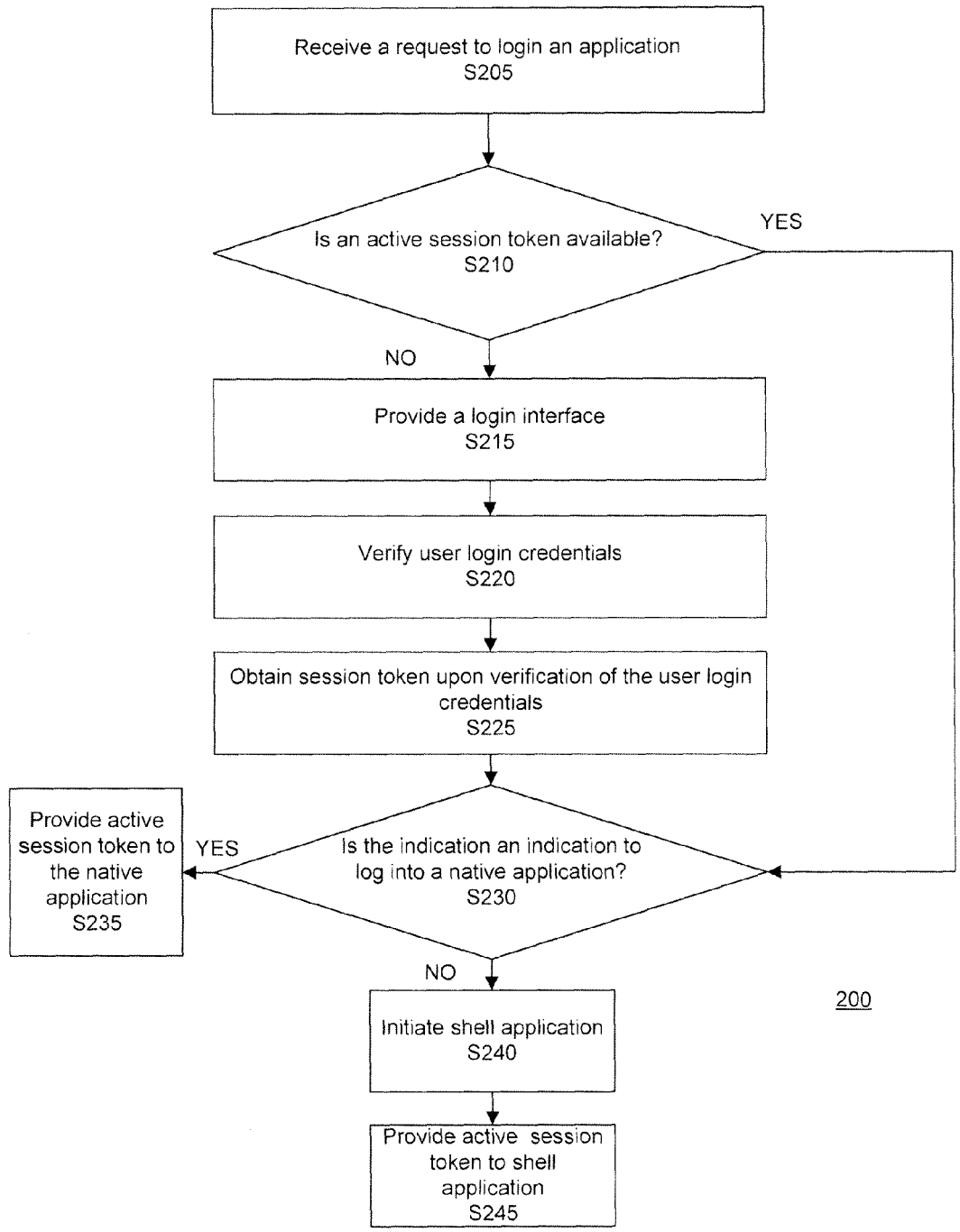
FIG. 2 is a flow chart useful in understanding a process for signing onto multiple applications on a mobile device.

FIG. 2 is a flow chart useful in understanding a process for signing onto multiple applications on a mobile device. Although the operations in process 200 are shown in a particular order, certain operations may be performed in different orders or at the same time. In addition, although process 200 is described with reference to the mobile device 11 of FIG. 1, process 200 is not limited to such and can be performed by other mobile devices.

As shown in FIG. 2, session maintainer application 146 receives a request to log into an application in block S205. This request may be generated in response to a user selection of an icon for a native application 144 or a web application requiring user login. At block S210, a session maintainer application 146 determines if a session token to log into the application is available. In one example, the session token may be stored in flash memory 114. If a session token is not available, the process proceeds to block S215, where a user login interface is provided on the mobile device 11. The user may then provide the user's login credential via the user login interface by operation of the user input element(s) of the particular type of mobile device. The mobile device 11 may communicate with a remote system associated with the application to verify the credential to access the application.

At block S220, the user login credential is verified to determine if the user should have access to the application. In an example, the verification process is performed locally by session maintainer application 146. In another example, the verification process is performed by the remote system. A session token is obtained in block S225 upon successful verification of the user login credential. In a case where the user's login credential is verified by the remote system, the session token may be generated by the remote system and provided to the mobile device 11. In a case where the user's login credential is verified by the session maintainer application 146, the session maintainer application 146 also generates the session token upon verification of the user's login credential. Alternatively, the session token may be generated locally by the session maintainer application 146 once the session maintainer application 146 receives an indication that the user's login credential has been verified.

The process then proceeds to block S230, where session maintainer application determines if the selected application is a native application. Returning momentarily to S210, if the session maintainer application 146 determined that a session token is available at block S210, the process will have proceeded directly to block S230 jumping over steps 215 to 225. At S230, if the selected application is a native application 144, then the session maintainer application 146 provides the session token to the selected native application in block S235. The processor 112 executes the native application 144 locally to configure the mobile device 11 to make various functions of the application 144 available to the user via the device 11. Alternatively, if the selected application is not a native application, a shell application 148 is initiated in block S240 and the session token is provided to the shell application 148 in block S245. The processor 112 executes the shell application 148 to initiate communication with a web application running on a server via the shell application 148. The shell application 148 receives content associated with the web application.

Several conditions may cause the session token to expire. For example, a session token may expire if it is not used for more than a threshold period of time, after it has been generated for more than a threshold period of time, after the mobile device is powered off, etc. If a session token has expired, then session maintainer application 146 provides a user login interface for display on the mobile device 11 when the user next attempts to utilize an application that requires entry of the user's login credential. The session maintainer application 146 then verifies the login credential as discussed above, and if the user provided login credential is verified, a new session token that contains the user's login credential is generated.

Figure 3:
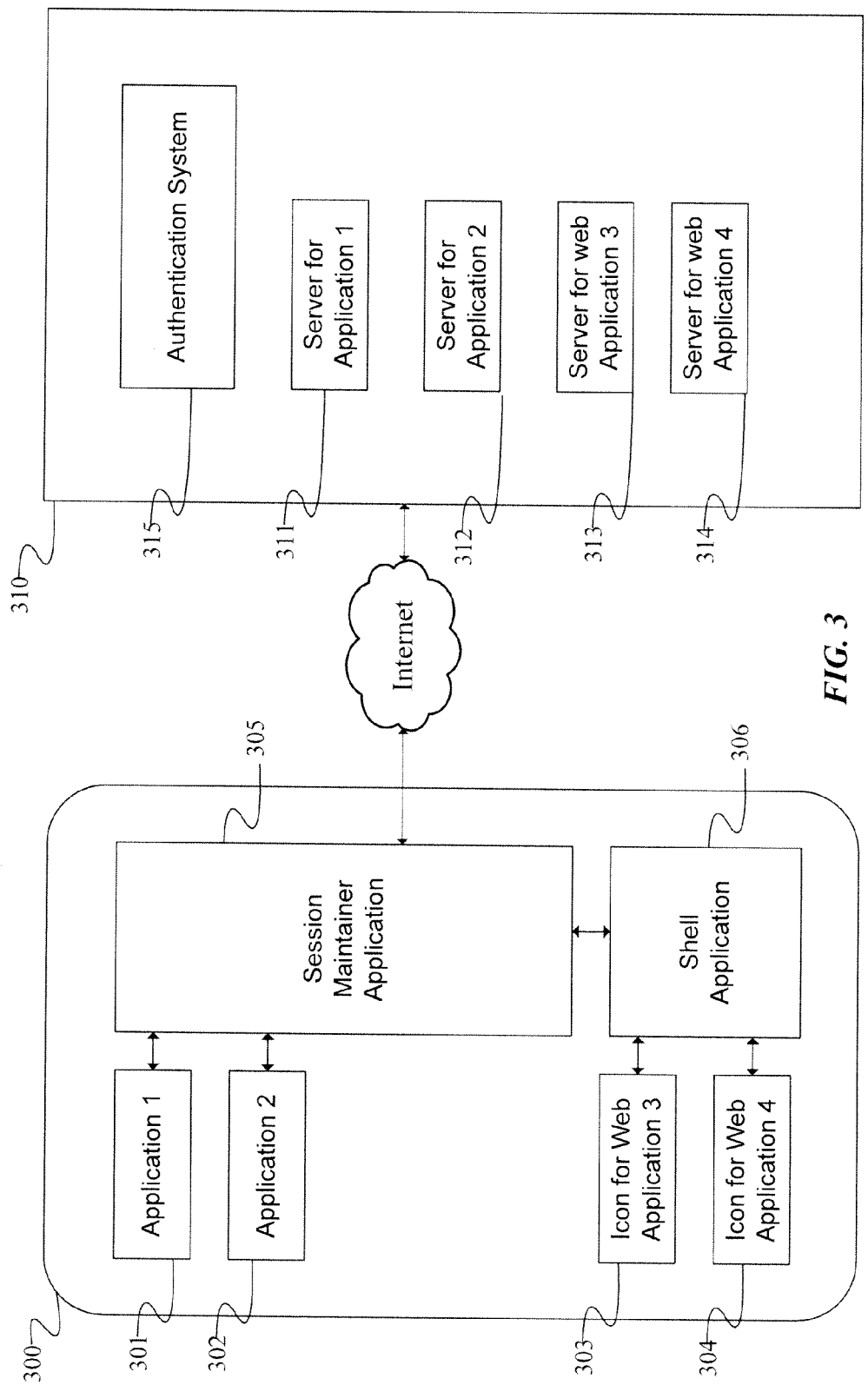
FIG. 3 is an illustration of a network environment for signing onto multiple applications on a mobile device.

FIG. 3 is an illustration of a network environment for signing onto multiple applications on a mobile device. As shown in FIG. 3, the mobile device 300 contains two native applications (application 1 301 and application 2 302) and two icons for web applications (application 3 303 and application 4 304). The mobile device 301 also contains a session maintainer application 305 and a shell application 306. The enterprise system 310 may be hosted by a single server, or may be hosted by multiple servers. In the example of FIG. 3, content associated with applications 1-4 301-304 are hosted by servers 311-314 of enterprise system 310. In other examples, content associated with applications 1-4 301-304 may be hosted by a different number of servers. Furthermore, content associated with applications 1-4 301-304 may be hosted by one or more servers that are remote from the enterprise system 310. In the example of FIG. 3, the enterprise system 310 has access to an authentication system 315, which authenticates user login credential to access applications 1-4. In other examples, a different authentication system may be used to verify the user login credential.

When the user of the mobile device seeks to access a native application (e.g., application 1 301 or application 2 302), a request to access the native application is sent to session maintainer application 305. The session maintainer application 305 checks to see if a session token is available. If a session token is not available, the session maintainer application 305 provides a user login interface which requires the user to provide login credential. The session maintainer application 305 then verifies the user's login credential with the enterprise system 310 and a session token is generated upon verification of the user's login credential. In one example, the session token is generated by the enterprise system 310 (e.g., by the authentication system 315, etc.) and provided to the mobile device. In another example, the session maintainer application 305 receives an indication that the user's login credential has been verified from the enterprise system 310 and generates the session token. Once a session token is generated, the generated session token may be used by applications 1-4 301-305 as long as the session token remains active, after which, subsequent user attempts to access applications 1-4 would require a new session token to be generated.

When the user tries to access a web application (e.g., by interacting with web icons for web application 3 303 or web application 4 304) shell application 306 is launched. The shell application 306 is a native application that runs on the mobile device and is designed to provide core functionalities of a web browser. The shell application's functionalities are further described herein. A request to access the shell application 306 is sent to the session maintainer application 301 and the process for providing a session token as described in the previous paragraph is repeated.

Figure 4:
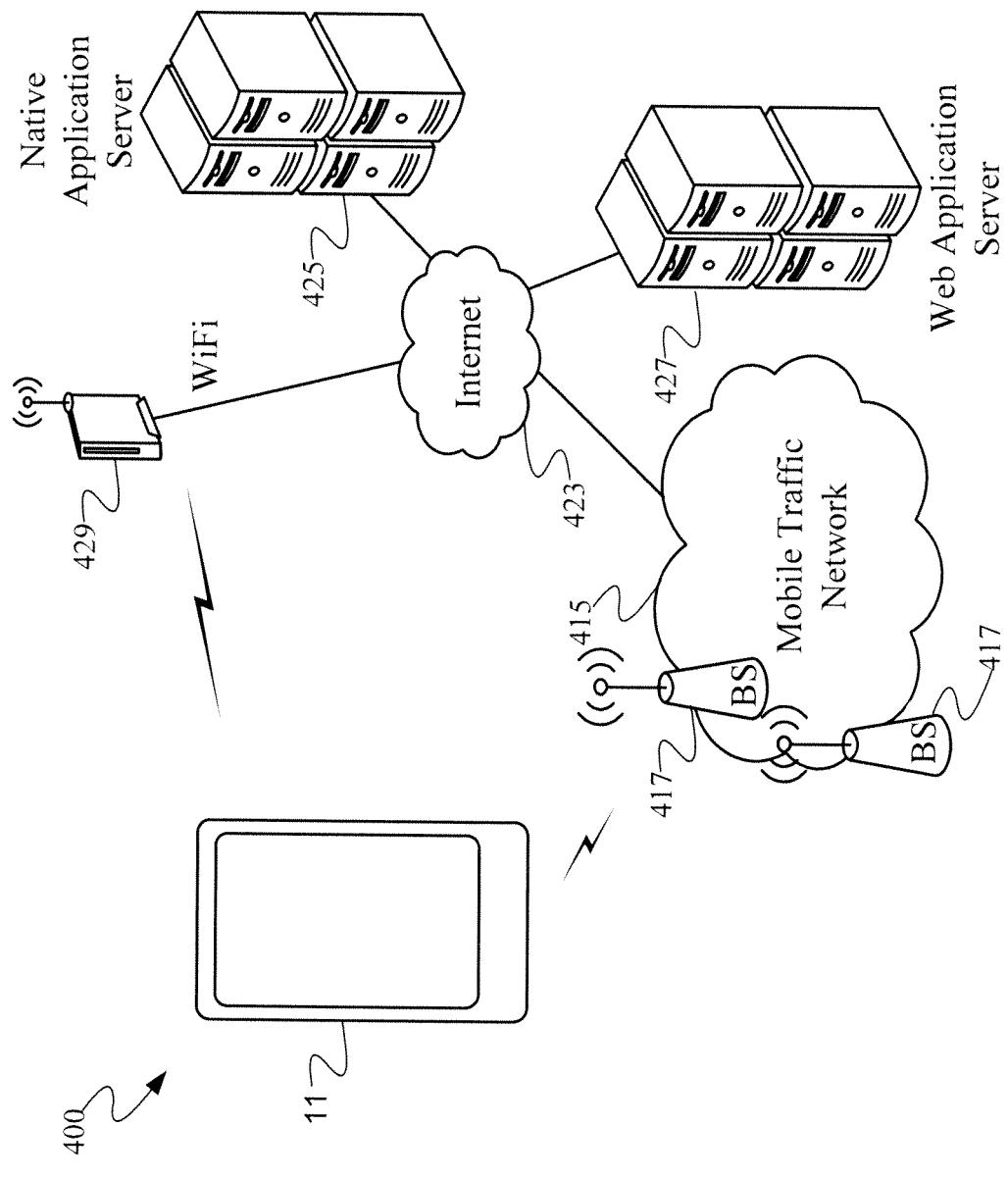
FIG. 4 illustrates a system offering a variety of mobile communication services, including communications that may involve or relate to single sign-on to multiple mobile device applications.

FIG. 4 illustrates a system 400 offering a variety of mobile communication services, including communications that may involve or relate to single sign-on to multiple mobile device applications. Communications related to single sign on for native and web applications may involve communication with other equipment and/or mobile carrier provided network transport or wireless local area network transport and the Internet to communicate related information to and from the mobile device 11.

The example shows simply one mobile device 11 as well as a mobile communication network 415. The mobile device 11 is a smart phone type device, in this case that utilizes a touch screen for the user interface, including for any communication related to single sign on for native and web applications and/or obtaining content or processing results via network communications with appropriate servers of the type discussed above relative to FIG. 1. The network 415 provides mobile wireless communications services to mobile devices including device 11, for example, via a number of base stations (BSs) 417 of the network 415. The present techniques may be implemented in any of a variety of available mobile networks 415 and/or on any type of mobile device compatible with such a network 415 under consideration here, and the drawing shows only a very simplified example of a few relevant elements of the network 415 for purposes of discussion here. Although only the one user's device 11 is shown, the network 415 will provide various communications for many other similar users and their various devices as well as for mobile devices/users that do not participate in the communications for single sign on for native and web applications and/or obtaining content or processing results via network communications with appropriate servers under consideration here.

The wireless mobile communication network 415 may be implemented as a network conforming to any of the applicable standards for public mobile wireless communications, examples of which include, but are not limited to, Code Division Multiple Access (CDMA) and 3rd Generation Partnership Project (3GPP) network technologies including, for example and without limitation, 3GPP type 2 (or 3GPP2) and 3GPP Long Term Evolution (LTE), at times referred to as "4G."

Many of the mobile devices served by network 415, including device 11 in our example, are capable of voice telephone communications through the network 415, various types of mobile messaging service communication and mobile data communications. Although the messaging service transport could be used, the exemplary device 11 will typically utilize data communications through the particular type of network 415 for the communications related to single sign on for native and web applications and a user of such a device 11 typically will have subscribed to data service through the network 415.

In general, the network 415 offers users of the mobile devices such as device 11 (and other mobile devices not shown) IP data transport for a variety of data services, e.g., via the Internet 423, such as downloads, web browsing, email, etc. Such communications may be with other mobile devices, various other types of user terminals and/or computers configured as servers. For the communications related to single sign on for native and web applications and/or obtaining content or processing results via network communications with appropriate servers, the drawing shows two examples of servers, connected in the example via the Internet 423.

In the example of FIG. 4, the first server 425 is a server associated with a native application. The first server receives, from mobile device 11, requests to access content associated with the native application. The first server 425 may include a login credential authentication system which verifies the received login credential. Upon verification of the user's login credential, the mobile device 11 may receive data related to content from the server 425 associated with the native application through the network 415 and the Internet 423 from the application server 425 (FIG. 4).

In the example of FIG. 4, the second server 427 is a server that hosts a web application. The second server 427 executes the web application (or obtains content from execution on another server platform). The second server receives, from mobile device 11, requests to access content associated with execution of a web application. The second server 427 may include a login credential authentication system which verifies the received login credential. Upon verification of the user's login credential, the mobile device 11 may receive data related to content from the server implementing a web application through the network 415 and the Internet 423 from the second server 427 (FIG. 4). In an example, a single server may also contain both content associated with the native application and content associated with the web application. Furthermore, a single user authentication system may be used to verify the user login credential to access both the native application and the web application.

To insure that the service offered by servers 425 and/or 427 is available on a virtually continuous uninterrupted basis for many similar users/devices, each server is typically implemented on many similar platforms on a distributed basis.

As noted in the discussion of the device 11 relative to FIG. 1 above, the device may be capable of WiFi communication as well as or instead of mobile wireless communication via a network like the illustrated carrier network 415. Hence, for discussion purposes, the drawing also shows a WiFi access point 429 connected to the Internet 423.

The WiFi access point 429 may be a hotspot in a public or commercial venue, which provides Internet access within the vicinity; or the WiFi access point 429 may be secured to provide private access in a home, an office, on a campus, or the like. The access point 429 provides WiFi enabled devices like mobile device 11 with wireless IP packet data communication, in this case, for access to the Internet 423. When available, communication related to single sign on for native and web applications and/or obtaining content or processing results via network communications with either of the servers 425 and 427 may utilize WiFi instead of wireless mobile communications through the network 415, for essentially the same types of actions related to single sign on for native and web applications and/or obtaining content or processing results via network communications with appropriate servers.

As shown by the above discussion, functions relating to single sign on for native and web applications as shown in FIG. 1 may be implemented using executable programming on an appropriate mobile device and in at least some cases may involve communication with servers or the like connected for data communication via the components of a data network, such as the first server 425 and/or the second server 427 as shown in FIG. 4. In addition to the functions related to providing data relating to single sign on for native and web applications and/or obtaining content or processing results via network communications with appropriate servers in the specific example of FIG. 4, the same or other server(s) may support downloading of original of upgrade versions of the relevant programming (e.g., session maintainer application 146) for the mobile device 11, through a network to install the programming in the device 11. Although special purpose devices may be used for any of these server functions, such servers also may be implemented using one or more hardware platforms intended to represent a general class of data processing device commonly used to run "server" programming so as to implement the respective functions discussed above, albeit with an appropriate network connection for data communication.

FIGS. 5 and 6 provide functional block diagram illustrations of general purpose computer hardware platforms. FIG. 5 illustrates a network or host computer platform, as may typically be used to implement a server. FIG. 6 depicts a computer with user interface elements, as may be used to implement a personal computer or other type of work station or terminal device, although the computer of FIG. 6 may also act as a server if appropriately programmed. It is believed that the structure, programming and general operation of such computer equipment should be self-explanatory from the high-level illustrations.

The software functionalities involve programming, including executable code as well as associated stored data, e.g., executable code and associated data files used for the session maintainer application 146. The software code is executable by the microprocessor 112 or other programmable processor of the mobile device 11, although as noted, at times, such software may be stored in another computer platform and downloaded through a network for installation in the mobile device 11.

Hence, aspects of the methods of single sign on for native and web applications and/or obtaining content or processing results via network communications with appropriate servers, and related action processing outlined above may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of a merchant or an application store into the mobile terminal of the customer/user. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A mobile device, comprising:
   a wireless transceiver configured to enable wireless data communication via a network;
   at least one user interface element, configured to provide information to a user of the mobile device and receive information from the user of the mobile device;
   a memory;
   a processor coupled to the wireless transceiver, the at least one user interface element, and the memory; and
   programming stored in the memory for execution by the processor, wherein the programming includes:
   a native application for execution by the processor in response to a user input of a credential via the at least one user interface element;

a link to a web application hosted by the network;

a shell application for execution by the processor to configure the mobile device to communicate through the network to access the web application, wherein the shell application is configured to receive the user input of the credential, and wherein upon receipt of the user input of the credential, the shell application is further configured to communicate through the network to access the web application; and a session maintainer application, wherein execution of the session maintainer application by the processor configures the mobile device to perform functions, including functions to:

upon execution of a first application of the native application and the web application via the mobile device, when an active session has not yet been established, obtain the user input of the credential via the at least one user interface element;

upon successful verification of the user input as corresponding to a reference credential, obtain a session token for use by the first application and a second application of the native application and the web application, store the session token in the memory, and enable user access to a function provided by execution of the first application via the mobile device; and upon execution of the second application of the native application and the web application via the mobile device, and based on existence of the session token, enable user access to a function provided by execution of the second application via the mobile device without requiring user input corresponding to said credential.

2. The mobile device of claim 1, wherein:
the session token is configured to expire after a predetermined period of time, and
execution of the session maintainer application by the processor configures the mobile device to perform functions, including functions to:
determine whether the obtained session token has expired;
in response to determining that the obtained session token has expired, obtain a new user input of the credential via the at least one user interface element; and
obtain a new session token upon successful verification of the new user input as corresponding to the reference credential.

3. The mobile device of claim 1, wherein execution of the session maintainer application by the processor further configures the mobile device to perform functions, including functions to:
determine whether user access of the second application of the native application and the web application is to be granted upon receipt of an additional credential;
in response to determining that user access of the second application of the native application and the web application is to be granted upon receipt of the additional credential, obtain an additional user input of the additional credential via the at least one user interface element; and
upon successful verification of the additional user input as corresponding to an additional reference credential, obtain a new session token and enable user access to a function provided by execution of the second application via the mobile device.

4. The mobile device of claim 1, wherein execution of the session maintainer application by the processor further configures the mobile device to perform functions, including functions to:
determine whether user access of the second application of the native application and the web application is to be granted upon receipt of an additional credential;
in response to determining that user access of the second application of the native application and the web application is to be granted upon receipt of the additional credential, obtain an additional user input of the additional credential via the at least one user interface element; and
upon successful verification of the additional user input as corresponding to an additional reference credential, modify the session token to enable user access to a function provided by execution of the second application of the native application and the web application via the mobile device.

5. The mobile device of claim 1, wherein:
the obtained session token comprises the credential, and
the obtained session token is provided to a third application, the third application having a launch time subsequent to either the first or second application, to provide the credential to enable user access to the function provided by execution of the third application.

6. The mobile device of claim 1, wherein, the session token is obtained from a server implementing the first application upon successful verification of the user input as corresponding to the reference credential.

7. The mobile device of claim 1, wherein the obtained session token is generated by the session maintainer application upon successful verification of the user input as corresponding to the reference credential.

8. A method comprising steps of:
receiving, on a mobile device, one or more requests to log into one of a native application and a web application;
determining, in response to receiving each request to log into the one application, if a session token is available, the session token being for use by both of the native application and the web application,
when the session token is not determined to be available:
requesting a user login credential;
receiving, via a login interface, the user login credential;
verifying the received user login credential; and
obtaining the session token upon verification of the user login credential;
for a request to log into the native application for execution on the mobile device, providing the session token to the native application for execution on the mobile device; and
for a request to log into the web application, providing the obtained session token to a shell application for execution on the mobile device, wherein the shell application is configured to provide a user interface for user interaction with the web application.

9. The method of claim 8, further comprising the steps of:
determining whether the obtained session token has expired;
requesting, via the login interface, an additional user login credential in response to determining that the obtained session token has expired; and
obtaining a new session token upon verification of the additional user login credential.

10. The method of claim 9, wherein the obtained session expires after a predetermined period of time or if the mobile device is powered down.

11. The method of claim 8, further comprising the steps of:
determining if the available session token is sufficient to log into the one application;
requesting, via the login interface, an additional user login credential in response to determining that the available session token has expired;
obtaining a new session token in response to verifying the additional user login credential; and
providing the new session token to the one application.

12. The method of claim 8, further comprising the steps of:
determining if the available session token is sufficient to login the one application;
requesting, via the login interface, an additional credential in response to determining that the available session token has expired;
modifying the available session token to enable user access to the one application; and
providing the modified session token to the one application.

13. The method of claim 8, further comprising the steps of:
receiving web data from a server implementing the web application; and
providing the received web data for display in a user interface of the shell application.

14. The method of claim 8, further comprising:
receiving web data from a server implementing the native application; and
providing the received web data for display in a user interface of the native application.

15. An article of manufacture, comprising:
a non-transitory machine readable medium;
a programming for execution by a processor of a mobile device, wherein execution of the programming by the processor configures the mobile device to implement functions, including functions to:
receive, on a mobile device, one or more requests to log into one of a native application and a web application;
determine, in response to receiving each request to log into the one application, if a session token is available, the session token being for use by both of the native application and the web application,
when the session token is not determined to be available;
request a user login credential;
receive, via a login interface, the user login credential;
verify the received user login credential; and
obtain the session token upon verification of the user login credential;
for a request to log into the native application for execution on the mobile device, provide the session token to the native application for execution on the mobile device; and
for a request to log into the web application, provide the obtained session token to a shell application for execution on the mobile device, wherein the shell application is configured to provide a user interface for user interaction with the web application.

16. The article of claim 15, wherein execution of the programming by the processor configures the mobile device to implement functions, including functions to:
determine if the obtained session token has expired;
request, via the login interface, an additional user login credential if the obtained session token has expired; and
obtain a new session token upon verification of the additional user login credential.

17. The article of claim 16, wherein the obtained session expires after a predetermined period of time or if the mobile device is powered down.

18. The article of claim 15, wherein execution of the programming by the processor configures the mobile device to implement functions, including functions to:
determine if the available session token is sufficient to log into the one application;
request, via the login interface, an additional user login credential if the available session token has expired;
obtain a new session token in response to verifying the additional user login credential; and
provide the new session token to the one application.

19. The article of claim 15, wherein execution of the programming by the processor configures the mobile device to implement functions, including functions to:
receive web data from a server implementing the web application; and
provide the received web data for display in a user interface of the shell application.

20. The article of claim 15, wherein execution of the programming by the processor configures the mobile device to implement functions, including functions to:
receive web data from a server implementing the native application; and
provide the received web data for display in a user interface of the native application.

* * * * *